United States Patent [19]
Herr, Jr.

[11] 4,182,166
[45] Jan. 8, 1980

[54] DYNAMOMETER TEST STAND
[75] Inventor: Charles H. Herr, Jr., Peoria, Ill.
[73] Assignee: Caterpillar Tractor Co., Peoria, Ill.
[21] Appl. No.: 816,702
[22] Filed: Jul. 18, 1977
[51] Int. Cl.$^2$ ............................................. G01L 3/16
[52] U.S. Cl. .................................................... 73/134
[58] Field of Search ......................... 73/134, 135, 117

[56] References Cited
U.S. PATENT DOCUMENTS

| | | | |
|---|---|---|---|
| 3,221,547 | 12/1965 | Wong et al. | 73/134 |
| 3,312,105 | 4/1967 | Amtsberg | 73/135 |
| 3,513,695 | 5/1970 | Stoddard et al. | 73/134 |
| 4,062,234 | 12/1977 | Bartlett, Jr. et al. | 73/135 |

Primary Examiner—Charles A. Ruehl
Attorney, Agent, or Firm—Wegner, Stellman, McCord, Wiles & Wood

[57] ABSTRACT

A test stand including a dynamometer having a housing with two parts relatively rotatable about an axis, one of the parts defining an end of the dynamometer and serving as a rotary input adapted to be coupled to a rotary output of a mechanism to be tested, the other of the parts defining the other end of the dynamometer, a fixed base, a movable base mounted on the fixed base for movement generally parallel to the axis, a motor for moving the movable base on the fixed base, a self-aligning bearing on the axis and rotatably interconnecting the other end of the dynamometer and the movable base, a load cell adjacent the dynamometer other end and interconnecting the housing other part and the movable base, and a cradle mounted on the movable base intermediate the dynamometer ends for supporting the housing when the rotary input is not coupled to a mechanism to be tested.

13 Claims, 3 Drawing Figures

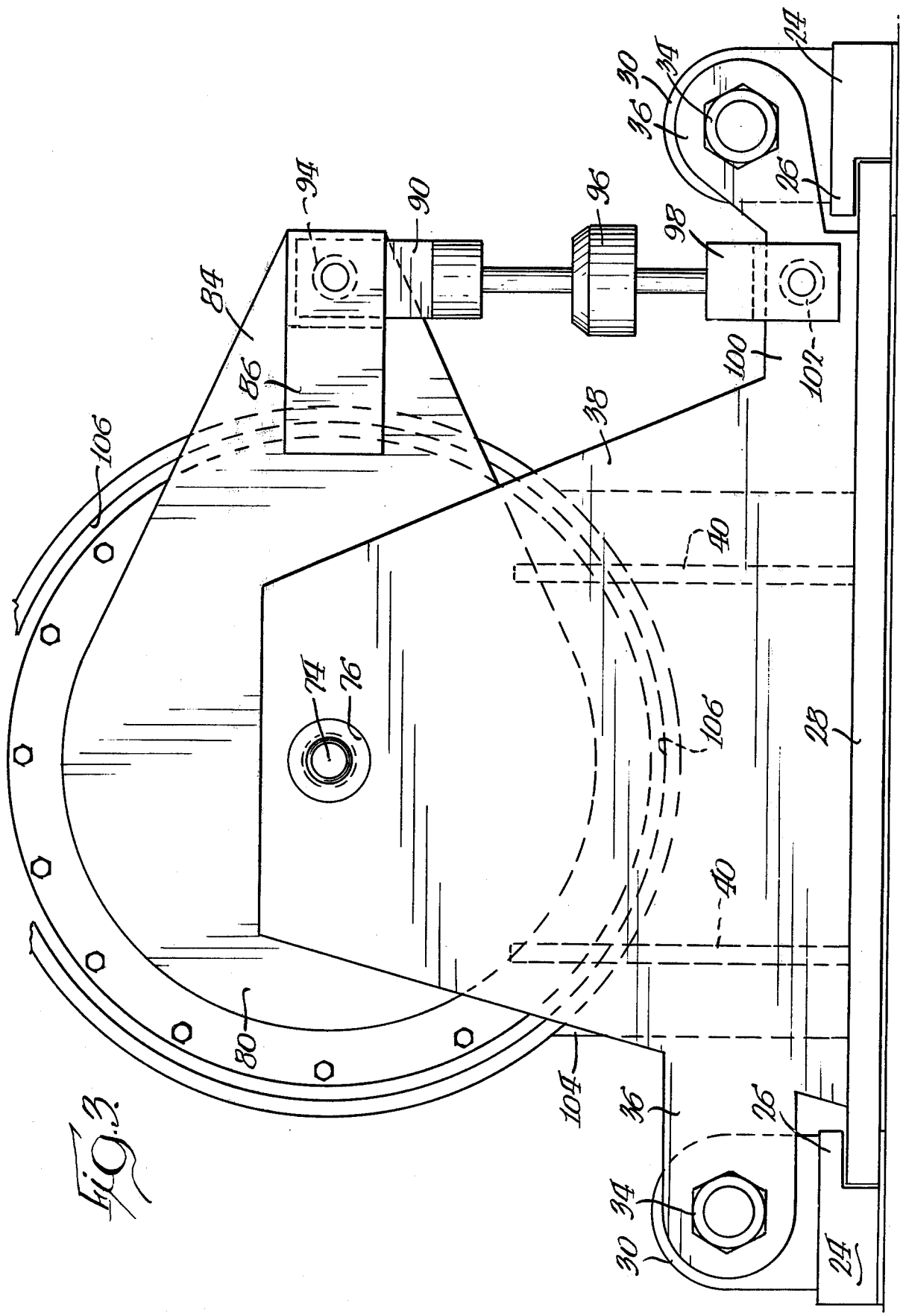

4,182,166

DYNAMOMETER TEST STAND

BACKGROUND OF THE INVENTION

This invention relates to test stands including dynamometers for testing rotary outputs of mechanisms as, for example, vehicles.

Manufacturers of quality mechanical power sources almost invariably test the source prior to releasing the same for sale to ensure that the source is performing properly and is up to its rated capability. In some cases, the testing has been performed with dynamometers, while in others, the testing has been performed by other means.

Dynamometer testing is generally preferred over other forms of testing by reason of an increased reliability of test results due to the elimination of subjective judgment on the part of operators and/or observers through the use of measuring apparatus. However, dynamometer testing is not altogether satisfactory, particularly where the mechanical power source being tested is operated at a relatively low speed and/or has a high torque output. For example, in crawler type vehicles, where the testing is to be performed at the final drive, rotational speeds of 100 rpm or less and high torque outputs are invariably present. Conventional dynamometers cannot adequately measure desired operational parameters in such cases or, if capable, are extremely costly, thereby discouraging their use. Consequently, the testing of power sources, such as crawler type vehicles, has generally been performed on a test track under the control of an operator with the result that the test results may be unreliable due to subjectivity involved on the part of the operator during the testing procedure.

To overcome the foregoing difficulty, Bartlett et al in the commonly assigned U.S. patent application Ser. No. 763,315, filed Jan. 28, 1977, Pat. No. 4,063,234, entitled "Testing Apparatus" and Kinney in the commonly assigned U.S. patent application Ser. No. 763,316, filed Jan. 28, 1977, Pat. No. 4,092,855, entitled "Dynamometer and Coupling for a Test Stand", have proposed testing apparatus and test stand constructions based on a dynamometer utilizing a liquid cooled, automotive disc brake to drastically reduce the cost of dynamometer testing such vehicles. The constructions proposed have worked extremely well and reliably for their intended purpose. They are, however, somewhat complex in construction, requiring large, precision bearings for rotatably supporting the dynamometer housing and expensive couplings for coupling the dynamometer to a chuck which engages the vehicle rotational output, which couplings are required to compensate for misalignment between the rotational output of the vehicle to be tested and the rotational axis of the dynamometer.

SUMMARY OF THE INVENTION

The present invention is directed to overcome one or more of the above problems.

According to the present invention, there is provided a test stand including a dynamometer having a housing and a rotary input at one end thereof adapted to be coupled to a rotary output of a mechanism to be tested and driven about an axis. A base mounts the dynamometer and a self-aligning bearing remote from said one end and interconnects the housing and the base for relative rotation about the axis. A load cell is disposed in adjacency to the self-aligning bearing and interconnects the housing and the base.

Other objects and advantages will become apparent from the following specification taken in connection with the accompanying drawings.

DESCRIPTION OF THE DRAWINGS

FIG. 3 is an elevation of the test stand.

DESCRIPTION OF THE PREFERRED EMBODIMENT

Figure 1:
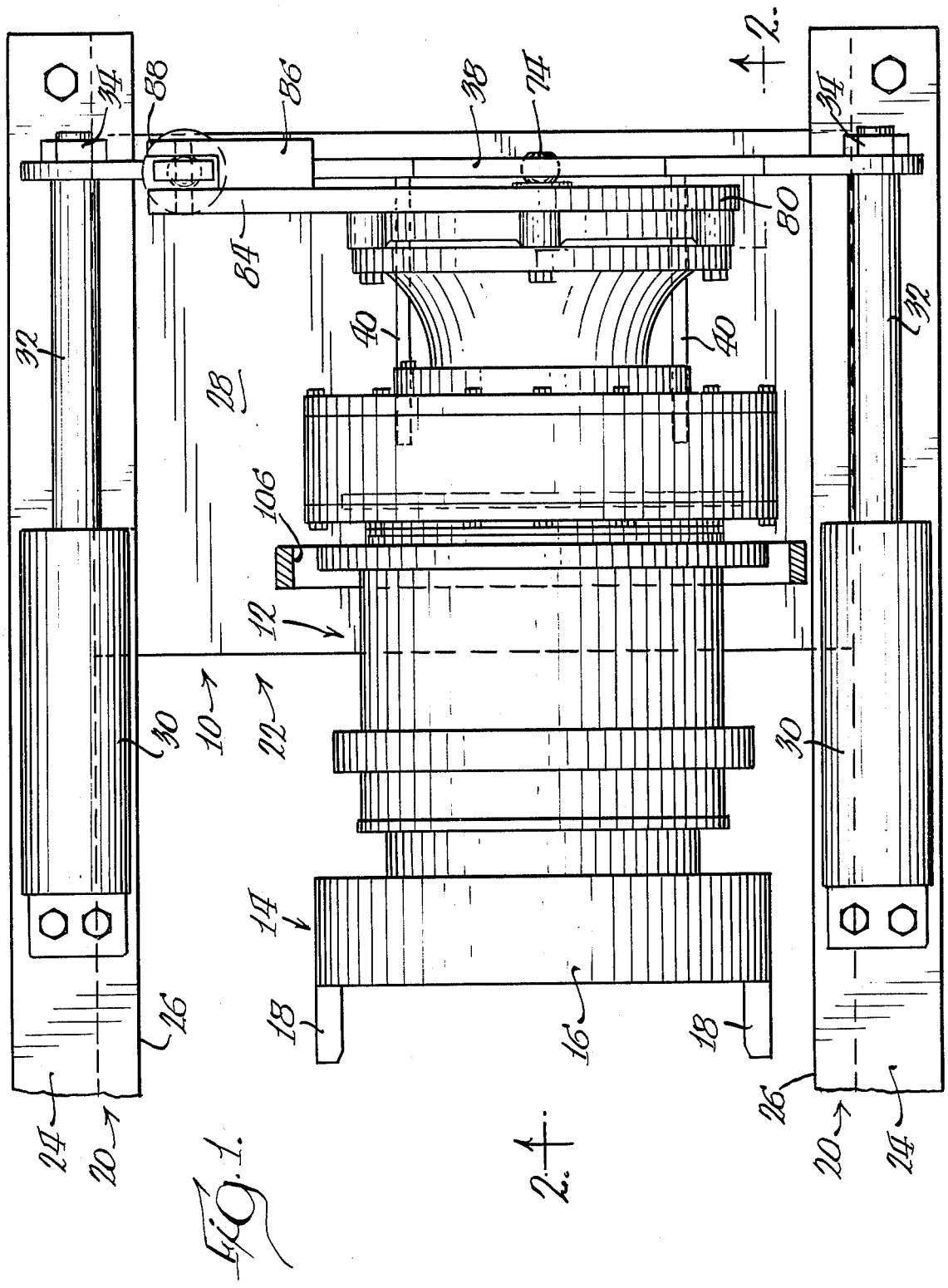
FIG. 1 is a plan view of a test stand embodying the invention.

An exemplary embodiment of a test stand made according to the invention is illustrated in the drawings and, with reference to FIG. 1, is seen to include a base, generally designated 10, rotatably mounting a dynamometer, generally designated 12, having a rotary input, generally designated 14, which is adapted to be coupled to the rotary output of a mechanism to be tested. In the embodiment illustrated, the rotary input is in the form of a chuck formed by a sleeve 16 having opposed, axially directed teeth 18, provided with guiding means, as will be seen, which are axially engaged with the drive sprocket of a crawler type vehicle or the like when the track has been removed. Of course, depending upon the geometrical configuration of the rotary output of the mechanism to be tested, the chuck may take on any of a variety of differing forms.

Figure 2:
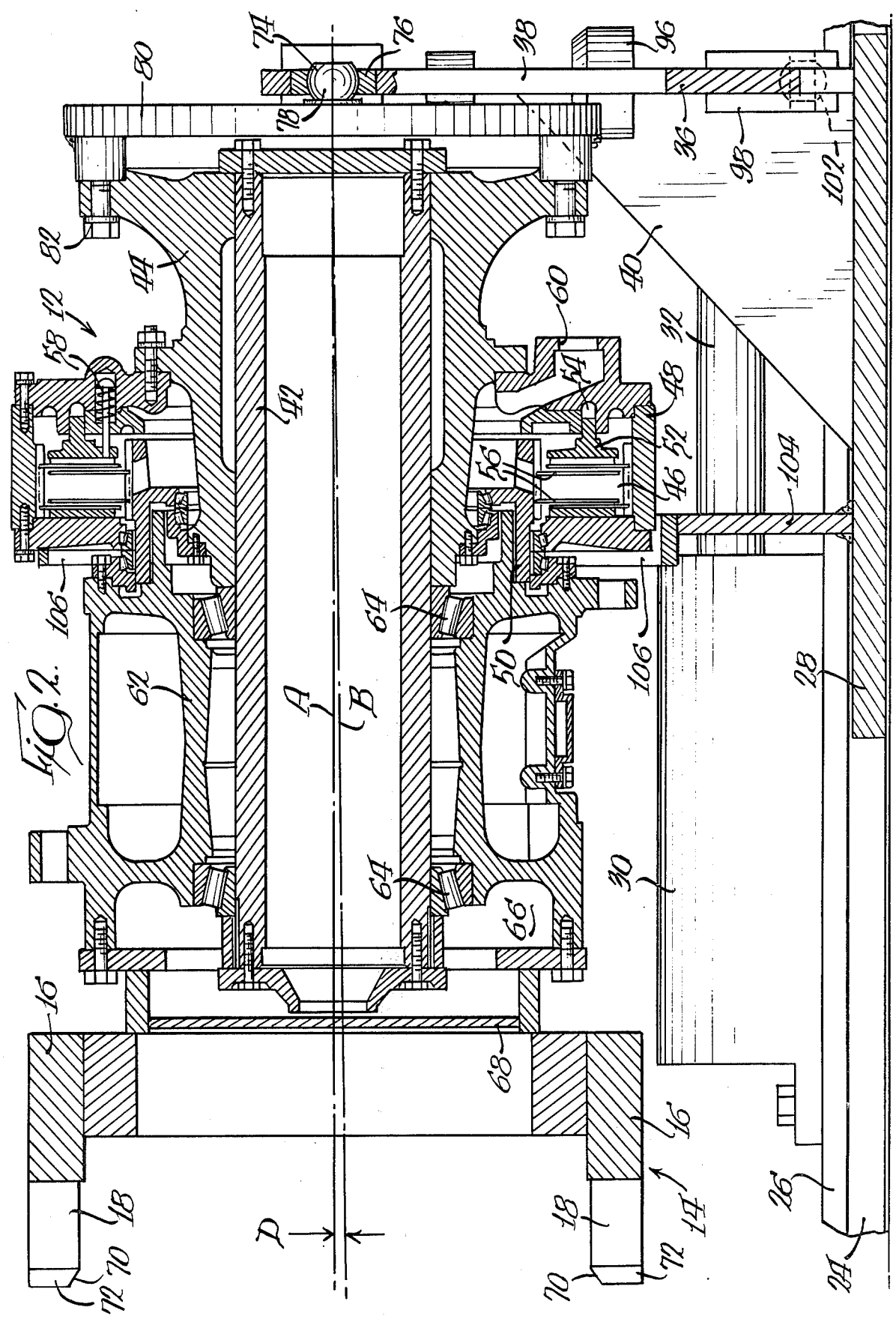
FIG. 2 is a sectional view of the test stand taken approximately along the line 2—2 of FIG. 1.

The base 10 is defined by a fixed base, generally designated 20, which may be affixed by any suitable means to the floor of the area housing the test apparatus, and a movable base, generally designated 22. As best seen in FIG. 3, the fixed base 20 is defined by a pair of generally parallel, spaced rails 24, each provided with a flange 26. As best seen in FIGS. 2 and 3, the movable base includes a generally horizontally disposed base plate 28 received between the rails 24 and underlying the flanges 26 to be captivated thereby. As a consequence, the movable base plate 28 is mounted for linear movement in a direction parallel to the length of the rails 24.

Each of the rails 24, on its upper surface, mounts the cylinder end of a hydraulic cylinder 30. The rod 32 of each cylinder is secured as by a nut 34 to a corresponding ear 36 extending from opposite sides of an upwardly directed plate 38. The plate 38 is mounted on the base plate 28 for movement therewith and reinforcing webs 40 interconnect the two to improve the structural rigidity of the movable base 22.

The dynamometer 12 is basically a commercially available, liquid cooled, heavy-duty, disc brake utilized, for example, in heavy hauling trucks designed for off-the-road use. The structure is generally that illustrated and described in the commonly assigned U.S. Pat. No. 3,301,359, issued on Jan. 31, 1967 to Cole et al, the details of which are herein incorporated by reference. While that particular brake construction, and the one illustrated herein, are in the form of hydraulically engaged, spring-disengaged brakes, those skilled in the art will recognize that spring-engaged, hydraulically-disengaged brakes could be utilized, if desired.

In the interests of brevity, only the major components of the brake defining the dynamometer 12 will be described in detail. The brake includes a conventional wheel spindle 42 which mounts a conventional bell housing 44. Various castings secured to the bell housing 44 define an annular chamber 46 in which there is disposed a series of interleaved, annular brake discs. Alternate ones of the discs are splined to that part 48 of the housing defining the chamber 46 which is secured to the bell housing 44, while the remaining discs are splined to that part 50 of the housing defining the chamber 46 which is rotatable. An annular piston 52 is axially movable upon the application of fluid under pressure to a chamber 54 to compress discs 56 within the chamber 46 and engage the brake. Springs 58 are connected to the piston 52 to retract the same and relax pressure upon the discs 56 when hydraulic pressure is not being applied to the chamber 54.

Axially directed inlet and outlet ports 60 (only one of which is shown) direct a liquid coolant, typically oil, to the annular chamber 46 to cool the brake discs as they heat up from friction when they are engaged. Preferably, fluid couplings along the lines of those disclosed in the previously identified Kinney application are utilized to eliminate the effect of the flow of hydraulic fluid on measurements being taken.

The rotatable part 50 defining a part of the chamber 46 is coupled by conventional means to the conventional wheel hub 62 of the brake which is journalled on the spindle 42 by bearings 64. The conventional final drive chamber 66 defined by one end of the hub 62 is illustrated in the drawings as being shortened and closed by a plate 68 to retain lubricant and prevent the entry of foreign material. If spatial requirements allow, the chamber 66 need not be shortened.

The plate 68, in turn, mounts by the means illustrated in FIG. 2, the sleeve 16 of the chuck 14.

The guide surfaces on the teeth 18 are illustrated in FIG. 1 and include radially inner, diagonal cam surfaces 70 and the sides of each tooth include diagonal surfaces 72 at the free ends which at least partially point the free ends of the teeth 18.

In the usual case, the dynamometer will be coupled to the output of the mechanism to be tested by axially advancing the dynamometer towards a fixed location whereat the output is disposed. This is accomplished by retracting the rods 32 of the cylinders 30 to advance the chuck 14 to the left, as seen in FIGS. 1 and 2. The cam surfaces 70 cam the chuck 14 into radial alignment with the vehicle sprocket, while the surfaces 72 cam the chuck 14 into circumferential alignment.

The dynamometer 12 is mounted on the movable base 22 for movement therewith by means of a self-aligning bearing 74, preferably, but not necessarily, in the form of a spherical bushing. The outer part of the bearing 74 is received within an opening 76 in the upper end of the plate 38, while the spherical part 78 of the bearing 74 is fixed to an adapter plate 80 secured as by bolts 82 to the bell housing 44.

The axis of rotation of the chuck 14 with respect to the bell housing 44 is designated by the line A in FIG. 2 and it is to be noted that the center of the spherical part 78 of the bearing 74 is disposed on that axis. Consequently, any misalignment between the dynamometer and the rotary output of the mechanism to be tested, when the two are coupled together via the chuck 14, is accommodated by skewing movement of the dynamometer about the center of the bearing 74.

It will also be observed that the bearing 74 mounts the dynamometer 12 for rotation relative to the base 22.

As best seen in FIG. 3, the adapter plate 80 includes a torque arm 84 extending to one side thereof. A block 86 is secured to the torque arm 84 on the side thereof remote from the chuck 14, as seen in FIGS. 1 and 3, and, as best seen in FIG. 1, includes a radially outwardly extending flange or arm 88 which, together with the end of the torque arm 84, define a yoke having its center in a plane encompassing the self-aligning bearing 74 and transerse to the axis of rotation of the chuck 14. In this plane, no part of the load cell load is transmitted to the sprocket as a radial load, and as such is the most desirable location. The axial location of the center of the yoke, whether near or in the above plane, does not affect the torque measurement, but only the radial loads on the bearing 74 and the teeth 18.

As seen in FIG. 3, a link 90 extends between the arm 88 and the torque arm 84 and is pinned thereto by a self-aligning bearing 94, also in the form of a spherical bushing. A conventional load cell 96 which will typically be a strain gauge of the type providing an electrical output (although other types of load cells providing other types of outputs may be utilized) is connected to the link 90 and to an opposed, yoke-like link 98 which receives a horizontally extending part 100 of the right-hand ear 36. The yoke-like link 98 is connected to the part 100 by means of a self-aligning bearing 102, also in the form of a spherical bushing. As a consequence of this construction, it will be appreciated that the load cell 96 is also in a plane transverse to the rotational axis of the chuck 14 and encompassing the self-aligning bearing 74.

In operation, when the chuck 14 is coupled to a rotary output of a mechanism to be tested, the brake defining the dynamometer 12 will be engaged, with the result that rotation applied to the chuck 14 will be applied to the bell housing 44 when the discs 56 are engaged. The rotative force thus applied to the bell housing 44 will be applied via the torque arm 84 to the load cell 96, the output of which is indicative of the torque at the rotary output of the mechanism being tested.

When there is radial misalignment between the chuck 14 and the rotary output of the mechanism being tested, and the dynamometer 12 skews, as mentioned previously, slight inaccuracies may be generated due to the fact that the axis of rotation of the dynamometer 12 will no longer be exactly transverse to the plane including the bearing 74 and the load cell 96. A typical maximum shift due to such skewing is indicated by the line B of FIG. 2 and it will be appreciated that, by reason of the preferred location of the bearing 74 and the load cell 96 at the end of the dynamometer 12 remote from the chuck 14 minimizes the effect of skewing so that its affect on the results of the test is negligible. At the same time, it will be appreciated that the location of the components allows the greatest radial deviation from true alignment for a given degree of skewing. For example, as illustrated in FIG. 2, for the given angle between the lines A and B, a radial misalignment equal to the distance "D" is permitted. However, if the distance between the teeth 18 and the bearing 74 were halved, only half as much radial misalignment could be tolerated for the same angle of skewing.

When the dynamometer 12 is coupled to a rotary output of a mechanism to be tested, it is supported only by that rotary output through the chuck 14 and by the bearing 74. When the chuck 14 is disengaged from the rotary output, it is necessary to provide a second source of support for the dynamometer 12. To this end, an upwardly directed plate 104 is mounted on the base plate 26 remote from the bearing 74 and supports a continuous restraining ring or cradle 106 (FIG. 3)

slightly spaced from the lower extremity of and totally surrounding the brake defining the dynamometer 12. Thus, when the chuck 12 becomes disengaged from the rotational output of the mechanism being tested, the dynamometer 12 will shift but a small amount about the pivot provided by the bearing 74 and settle into the cradle 106. Preferably, the spacing is such that the surfaces 70 will be located in sufficient proximity to their desired position when the dynamometer is advanced toward the fixed rotational output of the mechanism to be tested that the radial camming provided by the surfaces 70 will occur to lift the dynamometer 12 out of engagement with the cradle 106. At the same time, in the event of a malfunction such as the breaking of a tooth 18, the ring-like cradle restrains movement of the dynamometer in all radial directions.

From the foregoing, it will be appreciated that the present invention provides a test stand capable for use in testing the outputs of mechanisms at low rpm's and/or high torques. The test stand may be economically fabricated based on commercially available brake components and eliminates any need for large, precision bearings for supporting the dynamometer and complex self-aligning couplings, thereby further reducing the cost of the stand.

The embodiments of the invention in which an exclusive property or privilege is claimed are defined as follows:

1. A test stand comprising:
    a dynamometer including a housing having opposed ends;
    one of said ends including a rotary input adapted to be coupled to a rotary output of a mechanism to be tested and driven about an axis;
    a base for mounting said housing;
    a single self-aligning bearing located on said axis and interconnecting said housing at the other end of the housing and said base for relative rotation about said axis; and
    a load cell adjacent said other end and interconnecting said base and said housing.

2. The test stand of claim 1 wherein said bearing and said load cell are disposed in a common plane transverse to said axis.

3. A test stand comprising:
    a dynamometer including a housing and a rotary input at one end thereof adapted to be coupled to a rotary output of a mechanism to be tested and driven about an axis,
    a base for mounting said dynamometer,
    a single self-aligning bearing remote from said one end interconnecting said housing and said base for relative rotation about said axis, and
    a load cell disposed in a plane substantially transverse to said axis and extending substantially through said bearing, said load cell interconnecting said housing and said base.

4. A test stand comprising:
    a dynamometer including a housing having two parts relatively rotatable about an axis, one of said parts defining an end of the dynamometer and serving as a rotary input adapted to be coupled to a rotary output of a mechanism to be tested, the other of said parts defining the other end of the dynamometer;
    a fixed base;
    a movable base mounted on said fixed base for movement generally parallel to said axis;
    means for moving said movable base on said fixed base;
    a self-aligning bearing on said axis and rotatably interconnecting said dynamometer other end and said movable base;
    a load cell adjacent said dynamometer other end and interconnecting said housing other part and said movable base; and
    cradle means mounted on said movable base intermediate said dynamometer ends for supporting said housing when said rotary input is not coupled to a mechanism to be tested.

5. The test stand of claim 4 wherein said cradle means is disposed below said housing.

6. The test stand of claim 5 wherein said housing one part mounts a chuck having guide means for guiding itself into coupled relationship with a rotary output of a mechanism to be tested.

7. The test stand of claim 4 wherein said self-aligning bearing comprises a spherical bushing.

8. The test stand of claim 4 wherein said dynamometer comprises a liquid cooled automotive disc brake.

9. A test stand comprising:
    a dynamometer including a housing having two parts relatively rotatable about an axis;
    a rotary input connected to one housing part;
    a fixed base;
    a movable base mounted on said fixed base for movement generally parallel to said axis;
    means for moving said movable base on said fixed base;
    a self-aligning bearing rotatably interconnecting said movable base and the housing other part;
    a load cell disposed in a plane generally transverse to said axis and generally including said bearing and interconnecting said housing other part and said movable base; and
    means spaced from said bearing for supporting said housing when said rotary input is not coupled to a mechanism to be tested.

10. The test stand of claim 9 wherein said movable base is below said housing and said supporting means comprises an upwardly extending cradle mounted on said movable base.

11. A test stand comprising:
    a dynamometer including a housing and a rotary input at one end thereof adapted to be coupled to a rotary output of a mechanism to be tested and driven about an axis,
    a base for mounting said dynamometer,
    a self-aligning bearing remote from said one end interconnecting said housing and said base for relative rotation about said axis,
    a load cell disposed in a plane substantially transverse to said axis and extending substantially through said bearing, said load cell interconnecting said housing and said base, and
    a cradle mounted on said base in spaced relation to said bearing for supporting said housing when said rotary input is not coupled to a mechanism to be tested.

12. A test stand comprising:
    a dynamometer including a housing having opposed ends;
    one of said ends including a rotary input adapted to be coupled to a rotary output of a mechanism to be tested and driven about an axis;
    a base for mounting said housing;

self-aligning bearing means interconnecting said housing on said axis remote from said one end and said base such that said housing is freely movable about a point on said axis and within the envelope of said bearing means; and a load cell adjacent said point and interconnecting said base and said housing.

13. A test stand comprising:

a dynamometer including a housing having opposed ends;

one of said ends including a rotary input adapted to be coupled to a rotary output of a mechanism to be tested and driven about an axis;

a base for mounting said housing;

means mounting said housing on said base for universal movement about a point on said axis near the housing other end; and a load cell adjacent said other end and interconnecting said base and said housing.

* * * * *